UNITED STATES PATENT OFFICE.

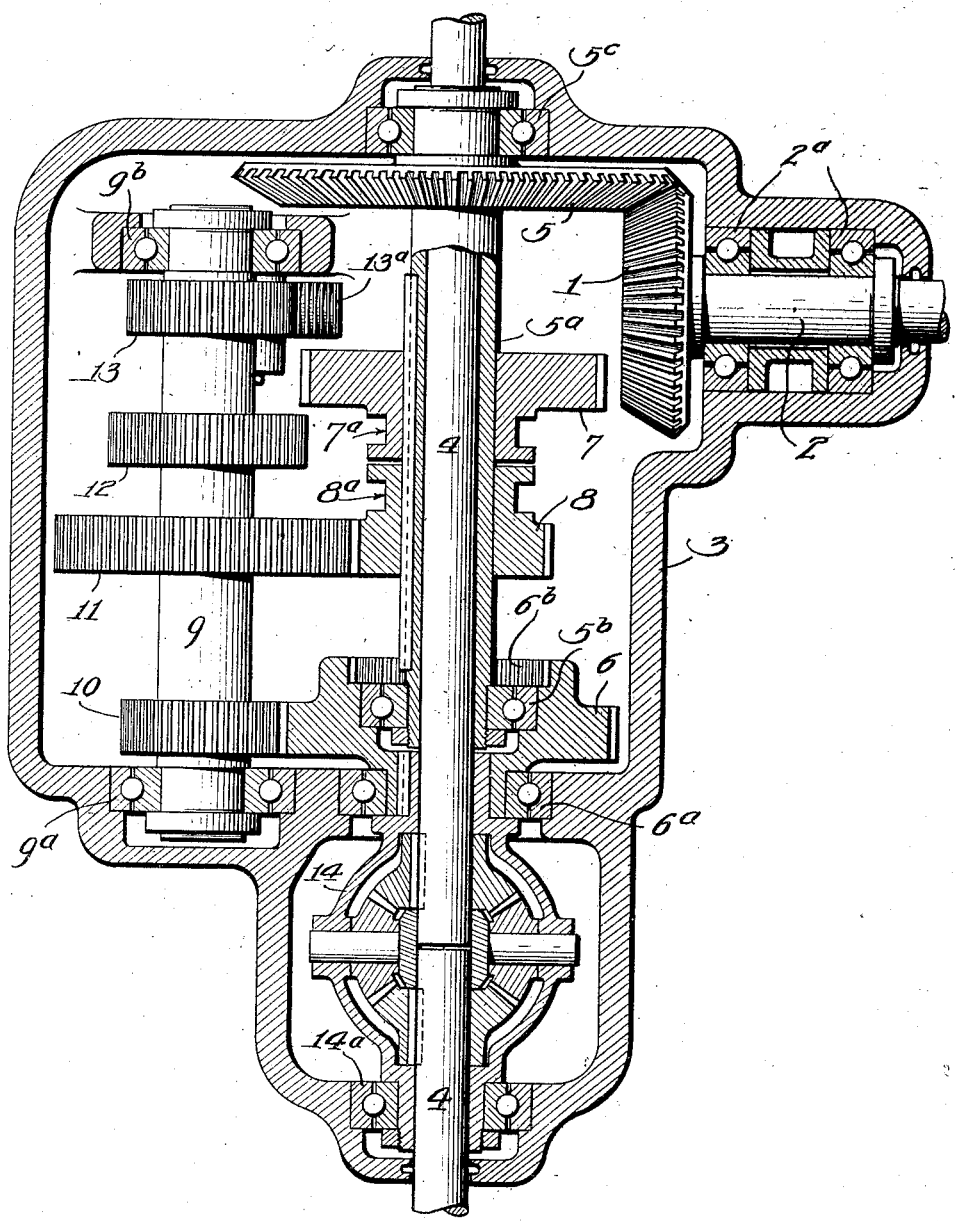

WILLIAM H. HUNT, OF NATIONAL CITY, CALIFORNIA.

POWER-TRANSMISSION MECHANISM.

1,048,076.  Specification of Letters Patent.  Patented Dec. 24, 1912.

Application filed May 13, 1912. Serial No. 696,889.

*To all whom it may concern:*

Be it known that I, WILLIAM H. HUNT, a citizen of the United States, and a resident of National City, in the county of San Diego and State of California, have invented certain new and useful Improvements in Power-Transmission Mechanisms, of which the following is a specification.

My invention relates to power transmission mechanisms and more particularly to those used in connection with automobiles, and the objects of my invention are, first, to provide a transmission mechanism so arranged that the gearings are provided with bearings set a sufficient distance apart to make the gearings stable and to provide a maximum bearing surface, second, to provide such a mechanism in which the driving gear and the gear with which it meshes and the shiftable gears are the only ones running when the transmission is neutral, and the engine is running idle, third, to provide a compact form of power transmission mechanism, and fourth, to provide a simple, durable, efficient and easily lubricated power transmission mechanism.

With these and other objects in view as will appear, my invention consists of certain novel features of construction, combination and arrangement of parts, as will be hereinafter described in detail, and particularly set forth in the appended claims,—reference being had to the accompanying drawings, and to the characters of reference thereon, which form a part of this specification,—in which:—The figure is a plan view in section showing my power transmission mechanism with a differential mechanism in connection therewith.

Similar characters of reference refer to similar parts throughout the drawing.

The driving gear 1, the driving shaft 2, casing 3, main shaft 4, driven bevel gear 5, constant mesh spur gear 6, large shiftable gear 7, small shiftable gear 8, counter shaft 9 with its gears 10, 11, 12, and 13, and differential mechanism 14, constitute the principal parts of my transmission mechanism.

The driving gear 1 is secured to the driving shaft 2, which is mounted on ball bearings 2ª, in the casing 3. Revolubly mounted on the main shaft 4 is a bevel gear 5, meshing with gear 1. The elongated hub 5ª of gear 5 is mounted in a ball bearing 5ᵇ in the hub of the constant mesh spur gear 6. The other end of said hub is mounted in the ball bearing 5ᶜ in casing 3. Slidably mounted on the elongated hub 5ª and adapted to revolve therewith are the shiftable gears 7 and 8, provided with grooves 7ª and 8ª, adapted to facilitate the shifting of the same by the ordinary means. Parallel to the shaft 4 is a countershaft 9 mounted in the ball bearings 9ª and 9ᵇ in the casing 3 and it is provided with spur gears 10, 11, 12 and 13, which are of various sizes. The gears 11 and 12 are adapted to mesh with the gears 7 and 8 when in certain relative positions. The gear 10 is constantly in mesh with the gear 6. The gear 13 is in constant mesh with a gear 13ª, which is mounted on a separate bearing and is adapted to mesh with gear 7 for the purpose of reversing the direction of the rotation of the main shaft 4. The gear 6 is rigidly secured to the extended hub of the differential mechanism 14, and is mounted in a ball bearing 6ª. In the hub of said gear 6 is provided an internal gear 6ᵇ, adapted to engage with the gear 8 and form a clutch for the purpose of driving the shaft 4 directly by means of the bevel gear 5. The opposite end of said differential mechanism is mounted in the ball bearing 14ª. The differential mechanism 14, except as to its attachment to the gear 6, is the same as is ordinarily in use.

It is obvious that with this construction and arrangement, there is provided a power transmission mechanism, so constructed and arranged, that the principal gears are provided with large bearing surfaces, and that their bearings are a sufficient distance apart to make them stable; that when the transmission mechanism is in the neutral, only the gear meshing with the driving gear and the shiftable gears are necessarily in motion; that the mechanism is compact and the parts are all adapted for efficient lubrication; that the shaft 2 being driven by any power will rotate the driving gear 1 secured thereto, the bevel gear 5 in mesh therewith, and the shiftable gears 7 and 8; that when in the relative positions as shown in the figure, gear 8 will rotate gear 11, carrying with it shaft 9; that gear 10 being secured on same shaft, it will rotate gear 6, carrying with it the differential mechanism and the main shaft 4; that the shaft 4 may be driven at various speeds relatively to the rotations of shaft 2, and that the direction of the rotation of the shaft 4 may be reversed by the shifting of gears 7 and 8.

Having thus described my invention, what I claim as new and desire to secure by Letters Patent is:—.

1. A power transmission mechanism, comprising a two piece main shaft, a differential mechanism mounted at the junction of the adjacent ends of said main shaft, a counter shaft mounted parallel with said main shaft, a bevel gear revolubly mounted on said main shaft provided with an extended hub, a plurality of shiftable gears mounted on said hub, a gear rigidly mounted on one member of said differential mechanism provided with an internal gear adapted for the teeth of one of said shiftable gears in one side thereof, a plurality of gears rigidly mounted on said counter shaft adapted to engage with said shiftable gears when in the proper relative positions, a drive gear adapted to mesh with said bevel gear, and a drive shaft upon which said drive gear is mounted.

2. A power transmission mechanism, comprising a two piece main shaft, a differential mechanism mounted at the junction of the adjacent ends of said main shaft, a countershaft mounted parallel with said main shaft, a bevel gear revolubly mounted on said main shaft provided with an extended hub, ball bearings supporting said extended hub, a plurality of shiftable gears mounted on said extended gear hub, a gear mounted on a member of said differential mechanism provided with a clutch member in one side thereof adapted to engage with the teeth of one of said shiftable gears, ball bearings between it and said extended hub, a plurality of gears rigidly mounted on said countershaft adapted to engage with said shiftable gears when in the proper relative positions, a drive gear adapted to mesh with said bevel gear, a gear on said counter-shaft in constant mesh with the gear on said differential member, and a drive shaft upon which said drive gear is mounted.

3. A power transmission mechanism, comprising a two piece main shaft, the pieces placed end to end, a differential mechanism mounted at the junction of the adjacent ends of said main shaft, a counter shaft mounted parallel with said main shaft, a plurality of various sized gear members mounted thereon, a bevel gear revolubly mounted on said main shaft, provided with an extended hub journaled at each end in ball bearings, a plurality of shiftable gears mounted on said hub, a gear adapted for constant mesh with one of the gear members on said countershaft mounted on a member of said differential mechanism provided with a clutch member in one side thereof, ball bearings on the other side thereof, a drive gear adapted to mesh with said bevel gear, a drive shaft upon which said drive gear is mounted and a casing provided with ball bearing supports for all the shaft journals inclosing said mechanism.

4. A power transmission mechanism comprising a main shaft composed of two pieces in alinement, a differential mechanism mounted at the junction of the adjacent ends of said main shaft, a countershaft mounted parallel with said main shaft, four various sized gear members mounted thereon, a bevel gear revolubly mounted on said main shaft provided with an extended hub mounted in ball bearings at each end, a plurality of shiftable gears mounted on said hub adapted to engage with a portion of said gear members when in certain relative positions, a gear mounted on a member of said differential mechanism provided with a clutch member in one side thereof, adapted to engage with one of said shiftable gears and form a clutch, a drive gear adapted to mesh with said bevel gear, a drive shaft upon which said drive gear is mounted, a casing inclosing said mechanism and ball bearing supports for all journals in said mechanism.

5. In a power transmission mechanism the combination of a two piece main shaft, a differential mechanism mounted at the junction of the adjacent ends of said main shaft, a countershaft mounted parallel with said main shaft, a plurality of gear members mounted thereon, a bevel gear provided with an extended hub revolubly mounted on ball bearings around said main shaft, a plurality of shiftable gears mounted on said extended gear hub adapted to shift endwise thereon, a gear rigidly mounted on a member of said differential mechanism provided with a clutch member in one side thereof adapted for one of said shiftable gears, a drive gear adapted to mesh with said bevel gear, a drive shaft upon which said drive gear is mounted, and a casing with two compartments, the one for the differential mechanism and the other for the change speed gearing.

In testimony whereof, I have hereunto subscribed my name in the presence of two subscribing witnesses.

WILLIAM H. HUNT.

Witnesses:
 ABRAM B. BOWMAN,
 GEORGE J. HUTING.